United States Patent [19]
Jury

[11] Patent Number: 5,882,710
[45] Date of Patent: Mar. 16, 1999

[54] CRIMPING CHOCOLATE, CHOCOLATE ANALOG AND CHOCOLATE SUBSTITUTE ARTICLES TO PREPARE CONTAINERS

[75] Inventor: Mark Jury, Thirsk, United Kingdom

[73] Assignee: Nestec S.A., Vevey, Switzerland

[21] Appl. No.: 752,872

[22] Filed: Nov. 20, 1996

[30] Foreign Application Priority Data

Nov. 20, 1995 [GB] United Kingdom .................. 9523681
Jul. 23, 1996 [GB] United Kingdom .................. 9615405

[51] Int. Cl.⁶ ........................................ A23P 1/12
[52] U.S. Cl. ........................... 426/512; 426/89; 426/138; 426/143; 426/282; 426/514; 426/516; 426/518
[58] Field of Search .............. 426/89, 101, 138, 426/139, 143, 279, 282, 514, 512, 516, 93, 94, 100, 518

[56] References Cited

U.S. PATENT DOCUMENTS

| | | | |
|---|---|---|---|
| 1,446,189 | 2/1923 | Laskey | 426/514 |
| 1,518,737 | 12/1924 | Griffith | 426/138 |
| 1,576,339 | 3/1926 | Laskey | 426/514 X |
| 1,649,307 | 11/1927 | Hunter . | |
| 1,649,308 | 11/1927 | Hunter | 425/133.1 |
| 1,802,698 | 4/1931 | Blanchard | 426/138 |
| 2,355,915 | 8/1944 | Hayden | 426/93 |
| 2,563,278 | 8/1951 | Rummel et al. | 99/136 |
| 2,613,488 | 10/1952 | Attride | 53/58 |
| 3,356,044 | 12/1967 | Keathley et al. | 107/1 |
| 3,867,559 | 2/1975 | Haas | 426/283 |
| 5,439,695 | 8/1995 | Mackey | 426/660 X |
| 5,635,230 | 6/1997 | Aasted | 426/138 |
| 5,728,414 | 3/1998 | Terrasi | 426/104 |

FOREIGN PATENT DOCUMENTS

| | | |
|---|---|---|
| 0434238 | 6/1991 | European Pat. Off. ......... A23G 3/20 |
| 0601194 | 6/1994 | European Pat. Off. . |
| 0603467 | 6/1994 | European Pat. Off. . |
| 643995 | 5/1928 | France . |
| 145517 | 7/1902 | Germany . |
| 2324344 | 12/1974 | Germany ............................ 426/132 |
| 106205 | 8/1924 | Switzerland . |
| 860666 | 11/1958 | United Kingdom . |
| 1596765 | 8/1981 | United Kingdom .................... 426/89 |

OTHER PUBLICATIONS

Title Page Including Abstract and Drawing of Schmitz, PCT Pat. Appln Publ. No. WO82/00082.
Title Page Including Abstract of Simelunas, et al., European Pat. Appln. Publ. No. 0164234.
Title Page Including Abstract of Jury, European Pat. Appln Publ. No. 0 730 827.

Primary Examiner—Milton Cano
Attorney, Agent, or Firm—Vogt & O'Donnell, LLP

[57] ABSTRACT

A container, such as a bag or a pouch, is made from a fat-based confectionery material, including such as a chocolate, and is formed by crimping an end or ends of a hollowed tube of the material or crimping edges of a sheet or sheets of the material brought together. The tube or sheet which is crimped is an extrudate which is, upon being obtained from an extruder, temporarily plastically deformable and thereby has a temporary flexibility, and the crimping is carried while the material is plastically deformable.

16 Claims, 2 Drawing Sheets

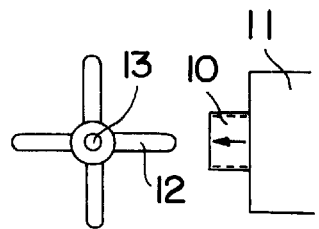
FIG. IA
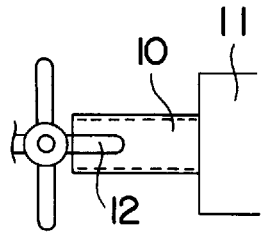
FIG. IB
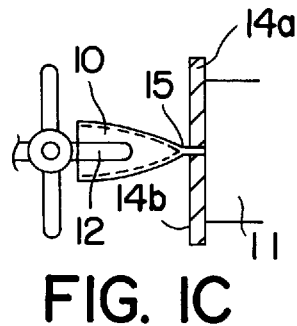
FIG. IC
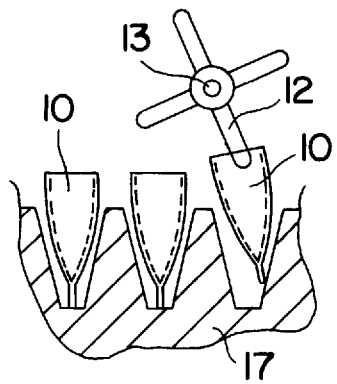
FIG. ID
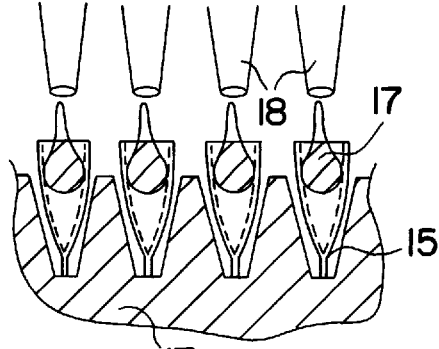
FIG. IE
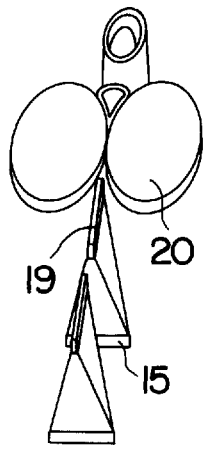
FIG. IF
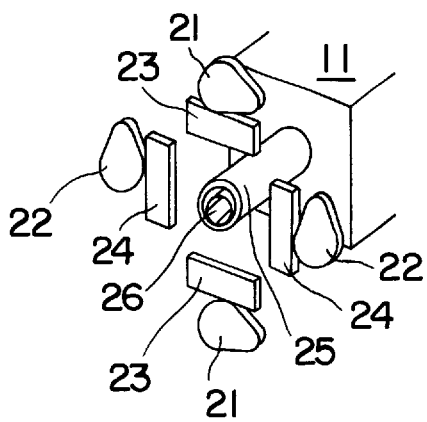
FIG. 2A
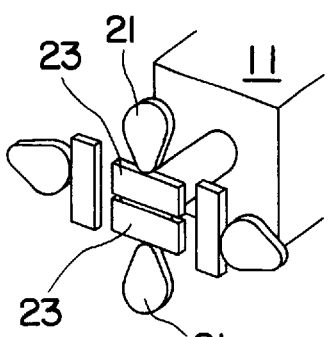
FIG. 2B

CRIMPING CHOCOLATE, CHOCOLATE ANALOG AND CHOCOLATE SUBSTITUTE ARTICLES TO PREPARE CONTAINERS

BACKGROUND OF THE INVENTION

The present invention relates to chocolate products, more particularly to chocolate products having one or more sealed edges to provide thereby a container, including such as a bag or a pouch, which may or may not contain a filling.

It is difficult to close the ends of solid tubular chocolate to form a bag or container by squeezing together to form a crimp-seal because the tube breaks before obtaining a seal owing to the brittleness of the chocolate. Therefore chocolate bags, pouches or similar containers having one or more crimp-sealed edges do not exist.

SUMMARY OF THE INVENTION

In European Patent Application Publication No. 0 603 467, the contents of which are hereby incorporated into the present specification, a method is described for the cold extrusion of chocolate or a fat-containing confectionery material in a solid or semi-solid non-pourable form whereby the extruded product has a temporary flexibility or plasticity enabling it to be physically manipulated or plastically deformed, e.g. it can be bent, twisted or forced into a mould. The extruded material is a solid or semi-solid product and may be a hollow profiled product such as a tube.

It has been found that a chocolate bag, pouch or similar container having one or more sealed edges can be formed by crimping a temporarily flexible, i.e., plastically deformable, hollow profiled product such as a tube produced by the process described in the aforenoted '467 Application.

Accordingly, the present invention provides a bag, pouch or similar container having one or more sealed edges made from a temporarily flexible, i.e., plastically deformable, solid or semi-solid chocolate or a fat-containing confectionery material, and the present invention provides processes which comprise crimping a hollow product of such material or crimping sheet edges of such material for obtaining a container product.

DETAILED DESCRIPTION OF THE INVENTION

The bag, pouch or similar container of the present invention may, for instance, have the shape of a pillow or a polyhedron such as tetrahedron. It may be completely enclosed or open at one or more parts of the edge. It may or may not contain a filling, and when it does, the filling may be solid or liquid and may be edible or non-edible. Examples of edible fillings are fondant, RICE CRISPIES cereal, mousse, praline, marshmallow, gummy novelty shapes, or it may be a chocolate or fat-containing confectionery material which may differ visually or texturally from the chocolate or fat-containing confectionery material of the bag, pouch or similar container. An example of a non-edible filling is a novelty plastic toy.

The length of the bag, pouch or similar container may be from 10 to 1000 mm, preferably from 20 to 250 mm and more usually from 25 to 100 mm. The width of the bag, pouch or similar container may be from 5 to 100 mm, preferably from 10 to 50 mm and more usually from 15 to 35 mm. The thickness of the wall of the bag, pouch or similar container may be from 0.25 to 10 mm, preferably from 0.5 to 5 mm and more usually from 0.75 to 2.5 mm.

The chocolate material may be dark, milk or white chocolate. Fat-containing confectionery materials may include sugar, milk-derived components, and fat and solids from vegetable or cocoa sources in differing proportions having a moisture content less than 10%, more usually less than 5% by weight. They may be chocolate substitutes containing direct cocoa butter replacements, stearines, coconut oil, palm oil, butter or any mixture thereof; nut pastes such as peanut butter and fat; praline; confectioner's coatings used for covering cakes usually comprising chocolate analogues with cocoa butter replaced by a cheaper non-tempering fat; or CARAMAC candy sold by Nestlé comprising non-cocoa butter fats, sugar and milk.

The present invention also provides a first process of producing a bag, pouch or similar container having one or more sealed edges made from chocolate or a fat-containing confectionery material which comprises crimping a temporarily flexible hollow profiled product made of chocolate or a fat-containing confectionery material.

The present invention also provides a second process of producing a bag, pouch or similar container having one or more sealed edges made from chocolate or a fat-containing confectionery material which comprises crimping the edges of two temporarily flexible substantially parallel sheets made of chocolate or a fat-containing confectionery material. For example, if the temporarily flexible substantially parallel sheets are square or rectangular, two, three or four edges may be crimped together. Advantageously, the two sheets may have different colours or flavours.

The present invention also provides a third process of producing a bag, pouch or similar container having one or more sealed edges made from chocolate or a fat-containing confectionery material which comprises folding a temporarily flexible sheet made of chocolate or a fat-containing confectionery material and crimping one or more edges of the folded sheet. The shape of such a product is analogous to ravioli.

Preferably, the temporarily flexible sheet or hollow profiled product made of chocolate or a fat-containing confectionery material is obtained by an extrusion process, especially by extruding the chocolate or fat-containing confectionery material through a suitable die at a temperature at which the chocolate or fat-containing confectionery material is in a solid or semi-solid non-pourable or non-flowable form throughout the extrusion to produce a product having a temporary flexibility or plasticity, e.g. for up to 4 hours, e.g. from 1 minute to 2 hours. Full details of this process are described in the afore-noted '467 European Application which explains that the temporary flexibility is dependent on the extrusion conditions and the chocolate ingredients.

As described in the afore-noted European '467 Application, the extrusion process comprises feeding a fat-containing confectionery material into an extruder and applying pressure to the fat-containing confectionery material in a substantially solid or semi-solid non-pourable form upstream of a flow constriction at a temperature at which the fat-containing confectionery material is extruded substantially isothermally and remains in a solid or semi-solid non-pourable form to produce an axially homogeneous extruded product having a cross-section which is of substantially a same profile as the die exit of the extruder.

As also set forth in the '467 Application, "substantially isothermally" means that the temperature of the fat-containing confectionery material remains substantially unchanged under the conditions of the extrusion from the input to the outlet of the flow constriction if there is no external heating or cooling means. The use of external heating or cooling means, however, is not excluded as long as the material being extruded remains in a substantially solid or semi-solid non-pourable state throughout the extrusion from the input to the outlet of the flow constriction. In other words, the temperature of the fat-containing confectionery material is not caused to increase substantially by the extrusion process itself. The physical state of the fat-containing confectionery material is such that its general deformation behavior during extrusion is of plastic nature rather than that of a viscous fluid. Additionally, an important feature of the extrusion process is that for a given die configuration and material composition, the extrusion rate is weakly dependent upon the extrusion pressure.

The flow constriction may be any narrowing of the cross-sectional area of a conduit but it is usually a die, and extrusion can be generated by a differential pressure across the flow constriction. This may be established, for example, by a ram extruder conveniently operating at a controlled rate or pressure. The extruder may be, for example, a DAVENPORT extruder, a constant pressure extruder, a single-screw extruder, a twin-screw extruder or CONFORM machine. The extrusion process may be continuous or batch.

The fat-containing confectionery material may be fed into the barrel of the extruder in a liquid or paste form, but it preferably is fed into the barrel in a solid or semi-solid non-pourable form. The fat-containing confectionery material may be in a granular or continuous form. When in granular form, the granular nature of the fat-containing confectionery material appears to be lost during extrusion to give an essentially uniform material.

The extrusion temperature may be from as low as 0° C. to about 35° C. depending on the composition, particularly the amount and type of fat present. When plain chocolate is used as the feed material, the extrusion temperature may be from 10° to 34° C., more usually from 15° to 32° C., preferably from 18° to 30° C. and more preferably from 20° to 27° C. In the case of milk chocolate, the extrusion temperature may be from 10° C. to 30° C., more usually from 15° C. to 28° C., preferably from 18° to 27° C. and more preferably from 20° to 26° C. It should be understood that, in this invention, when the chocolate is extruded at a temperature from 28° to 34° C. it is in a solid or semi-solid non-pourable state after being set hard in contrast to chocolate which has not been set hard such as recently tempered chocolate which has not been set hard and is still pasty and pourable at such temperatures.

The extrusion process necessarily includes a form of deformation between the input and outlet of the extrusion system. The convergence or contraction ratio into any extrusion orifice is preferably greater than 1.5, the convergence or contraction ratio being defined as the ratio of the inlet area to the minimum cross-sectional area of the die for a simple cylindrical extrusion geometry.

During extrusion, it is important that the fat-containing confectionery material does not become pourable and the extrusion temperature and pressure should be maintained below a level where this may happen.

The extrusion pressure is partially dependent, amongst other things, on the contraction ratio, the extrusion temperature and the confectionery composition and may be from 1 to 1000 bars, e.g. from 5 to 500 bars and typically from 5 to 250 bars.

An important feature of the extrusion process is that for a given die configuration and material composition, the extrusion rate is weakly dependent upon the extrusion pressure.

The sectional geometry of the die may be of a square or profiled form. Typically, it might be a conical entry with an inlet cone angle of from 10° to 90°. The flow rate of the chocolate through the extruder die will depend amongst other things on extrusion pressure, temperature, die configuration and material formulation. Extrusion rates may vary from 0.1 cm/second to in excess of 1 meter/second, for instance.

As disclosed also in the '467 Application, a wide variety of die shapes may be used and the extruded fat-containing confectionery material may have a solid profiled or hollow section and essentially has the same shape as the die, e.g. rods, spirals, twists, springs, hollow sections such as tubes and more complex shapes such as the letters of the alphabet as well as thin films having a thickness which may be as little as 100 microns. The dimensions of the die depend on the desired size of the extruded product. A multi-orifice die head could also be used, if desired. Multi-material co-extrusion is also possible with this technique, and the extrusion of the fat-containing confectionery material may be carried out as a co-extrusion with other food materials. Co-extrusion with other food materials such as ice cream, fondant, etc., is especially advantageous when the fat-containing confectionery material is extruded in a hollow or tubular form.

In a process of the present invention, the crimping of the edges of the temporarily flexible sheet or hollow profiled product may be carried out by conventional means, e.g. by pinching or pressing the edges together to unite them. For pinching or pressing the edges together, one or more pairs of co-operating jaws or rotating wheels made of metal or plastics may be used. The jaws may be mounted on a pair of scissor arms which are shut by actuators to pinch the opposite sides of the tubing together to unite the edges. Alternatively, the jaws may be operated by cams which rotate and snap the opposing jaws together to unite the edges. Preferably, the temporarily flexible sheet or hollow profiled product is stationary relative to the jaws during the pinch using these methods. Another method for crimping the edges of the temporarily flexible sheet or hollow profiled product may be carried out by two jaws mounted on counter-rotating wheels driven at the same speed such that the point of closest proximity of the jaws moves at the same speed as the chocolate extrusion to form the crimp. Further methods for crimping the edges of the temporarily flexible hollow profiled product may be carried out by using two small rollers which are pushed into opposite sides of the tube or by passing the edges through the nip of a pair of counter-rotating wheels.

For making a pillow shaped container, one end of a temporarily flexible hollow profiled product may be crimped to unite the edges of that end, a filling may optionally be introduced, and then the other end may optionally be crimped to unite the edges of that other end. The filling may be introduced by co-extrusion or by subsequent introduction.

For making a tetrahedron shaped container, one end of a temporarily flexible hollow profiled product may be crimped to unite the edges of that end, a filling may optionally be introduced, and then the other end may optionally be crimped to unite the edges of that other end at an angle of 90° to the first crimped joint.

The filling may be introduced into the temporarily flexible hollowed profiled product by the following methods:

i) an indexed feed method in which a measured amount of filling is injected via the open end of a small section of the temporarily flexible hollow profiled product. By this method, almost any type of filling may be introduced.

ii) A continuous co-extrusion method in which the temporarily flexible hollow profiled product is continuously filled as it is extruded. When this method is used, any crimping and cutting will be of a filled tube.

Desirably, the pinching action not only unites the edges of the finished product but also chops it off. This may be achieved by a guillotine method in which opposed blades pass in scissor fashion and hence cut through the product, or by a method in which the opposed blades meet at a point, or by a closed crimp method in which two rollers are pushed into the temporarily flexible hollow profiled product until they meet to cause separation.

If necessary, the united edges may be sealed with liquid chocolate.

The present invention is illustrated further by way of example only with reference to the accompanying drawings.

BRIEF DESCRIPTION OF THE DRAWINGS

FIGS. 1A–1F illustrate the steps of an indexed manufacture.

FIGS. 2A–2D illustrate the steps of a cam/crimp manufacture.

DETAILED DESCRIPTION OF THE DRAWINGS

Figure 2C:
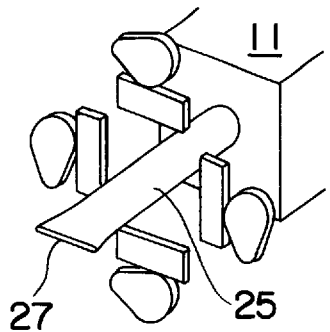

Referring to FIGS. 1A–1F, FIG. 1A shows a section of solid chocolate extrudate tubing 10 being extruded through and from the die 11. FIG. 1B shows the tubing 10, as it approaches the desired length, sliding over a small bar 12 positioned on an indexed wheel 13. When the tube is exactly the right length, as shown by FIG. 1C, two jaws 14a, 14b, crimp and cut the tube 10 in one action to close a tube portion end and to give a seal 15. FIG. 1D shows the indexed wheel 13 rotating through 90° causing the cut and crimped length portion of tubing 10 supported by the bar 12 to move away from the die 11 and from further extrudate tubing and to fall off the bar 12 for delivery onto a conveyor 16. FIG. 1E shows four cut and crimped portions of tubing 10 being filled simultaneously with a praline filling 17 in the exact amount desired by four nozzle injectors 18. FIG. 1F shows the final seal 19 being performed to close the remaining tube portion open end by a pair of rotating wheels 20 which crimp the top edge.

Figure 2D:
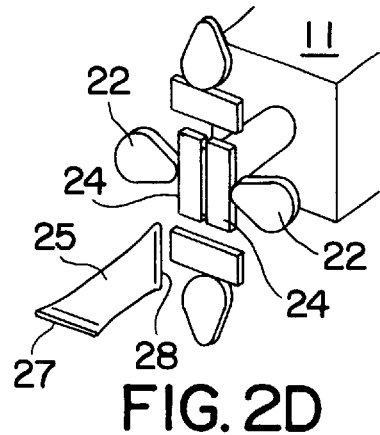

Referring to FIGS. 2A–2D, FIG. 2A shows two sets of opposed cams 21, 22 positioned to control the motion of two sets of jaws 23, 24, one set being at 90° to the other. A continuous tube of chocolate 25 is extruded through an extruder die 11, and a praline filling 26 is pumped into the chocolate tube to obtain a composite product. In FIG. 2B, the first set of jaws 23, operated by the first set of cams 21, is pushed into the side of the tube for closing and sealing the end 27 (shown in FIG. 2C), and the cams 21 rotate causing the jaws 23 to retract and allow the required length of chocolate tubing 25 with its sealed end 27 to be extruded. FIG. 2D shows the other set of jaws 24, operated by the other set of cams 22, pushing into the tube 25 to produce a second seal closure 28 at 90° to the first seal 27. Both sets of jaws contain a blade along their centres such that the pinching action not only seals the product but also chops it off and makes the first seal closure of the following product.

Figure 3A:
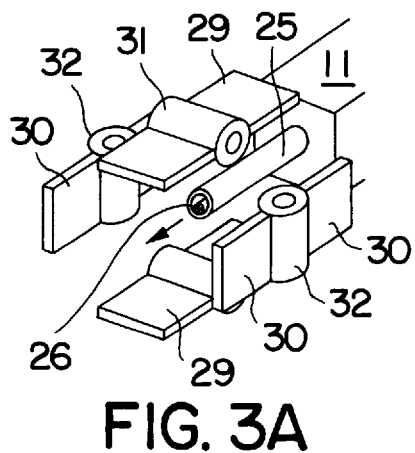
FIGS. 3A–3D illustrate the steps of a rotating wheel manufacture.
Figure 3B:
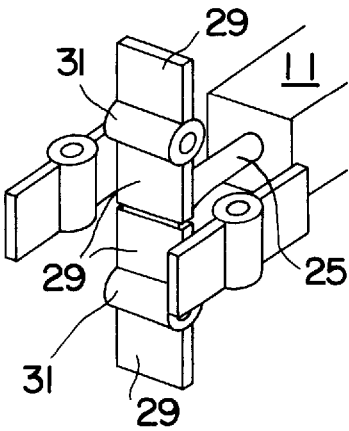
Figure 3C:
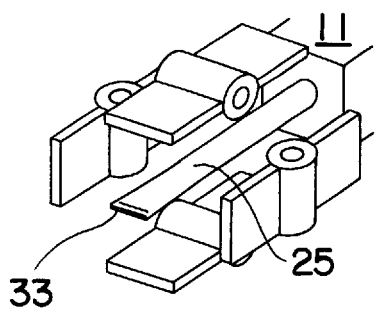
Figure 3D:
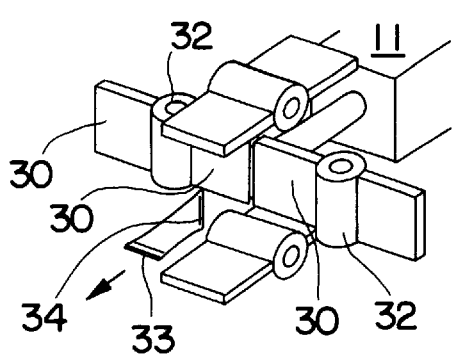

Referring to FIGS. 3A–3D, FIG. 3A shows two sets of jaws 29, 30 mounted on two sets of wheels 31, 32 and a length of chocolate tubing 25 with a fondant filling 26 already inside and being extruded continuously through a die 11. The wheels rotate at the same peripheral speed as the moving extruded chocolate tubing. FIG. 3B shows the first set of jaws 29 which rotate on the first set of wheels 31 at such a speed that the end points of the jaws move with the tubing and do not scuff the surface while pinching the tubing 25 to to close an end and make the first seal 33, as in FIG. 3C where the tubing is allowed to extrude further to the required length. In FIG. 3D the second set of jaws 30 rotate on the second set of wheels 32 at such a speed that the end points of the jaws move with the tubing and do not scuff the surface while pinching the tubing 25 to make the second seal closure 34 at 90° to the first seal closure 33. Both sets of jaws contain a blade along their centres such that the pinching action not only seals the product but also chops it off and makes the first seal closure of the following product.

I claim:

1. In a process for preparing a food article wherein a confectionery material selected from the group consisting of a fat-containing chocolate, of a chocolate substitute comprising a cocoa butter replacement and of a chocolate analog comprising a cocoa butter replacement is fed into an extruder and pressure is applied to the material to pass the material through the extruder and through an extruder flow constriction and die to obtain an extrudate from the die so that the material and the extrudate are in a non-pourable state and so that the material plastically deforms and so that the extrudate is plastically deformable for a period of time and wherein the extrudate has a hollowed tubular shape, the improvements comprising positioning a bar so that the tubular extrudate is extruded to the bar so that the bar extends within the tubular extrudate hollow to support the tubular extrudate and during the time the tubular extrudate is plastically deformable, supporting the tubular extrudate with the bar and cutting the tubular extrudate to obtain a tube portion which extends between two end edges and crimping at least one tube portion end edge to close at least one end of the tube portion.

2. A process according to claim 1 wherein the cutting and crimping are performed simultaneously.

3. A process according to claim 2 wherein a further improvement comprises after cutting and crimping to obtain a crimped tube portion having a closed end, moving the bar to deliver the crimped tube portion away from the die and from further extrudate.

4. A process according to claim 3 wherein further improvements comprise moving the bar to deliver the crimped tube portion to a conveyor so that the crimped tube portion is vertically positioned on the conveyor and so that the crimped closed end is positioned beneath a crimped tube portion top open end.

5. A process according to claim 4 wherein a further improvement comprises introducing a filling into the tube portion via the top open end.

6. A process according to claim 5 wherein a further improvement comprises crimping the top open end to close the top end.

7. A process according to claim 1 wherein a further improvement comprises co-extruding an edible substance with the tubular extrudate for filling the tubular extrudate hollow to obtain a composite product.

8. A process according to claim 2 wherein a further improvement comprises co-extruding an edible substance with the tubular extrudate for filling the tubular extrudate hollow to obtain a composite product.

9. A process according to claim 7 or 8 wherein the two tube portion ends are crimped.

10. A process according to claim 8 wherein a further improvement comprises cutting and crimping the one tube end portion of the composite product with a first set of jaws comprising a blade and then cutting and crimping the second tube end of the composite product with a second set of jaws comprising a blade.

11. A process according to claim 1 wherein a further improvement comprises applying a liquid chocolate to seal at least one crimped end.

12. In a process for preparing a food article wherein a confectionery material selected from the group consisting of a fat-containing chocolate, of a chocolate substitute comprising a cocoa butter replacement and of a chocolate analog comprising a cocoa butter replacement is fed into an extruder and pressure is applied to the material to pass the material through the extruder and through an extruder flow constriction and die to obtain an extrudate from the die so that the material and the extrudate are in a non-pourable state and so that the material plastically deforms and so that the extrudate is plastically deformable for a period of time and wherein the extrudate is a sheet, the improvements comprising, during the time the extrudate sheet is plastically deformable, folding the sheet to bring sheet edges together to obtain at least one edge portion comprising two brought-together sheet edges and crimping at least one of the brought-together edge portions to unite the brought-together sheet edges to obtain a crimped container article.

13. In a process for preparing a food article wherein a confectionery material selected from the group consisting of a fat-containing chocolate, of a chocolate substitute comprising a cocoa butter replacement and of a chocolate analog comprising a cocoa butter replacement is fed into an extruder and pressure is applied to the material to pass the material through the extruder and through an extruder flow constriction and die to obtain an extrudate from the die so that the material and the extrudate from the die are in a non-pourable state and so that the material plastically deforms and so that the extrudate is plastically deformable for a period of time and wherein the extrudate is a sheet, the improvements comprising, during the time the extrudate sheet is plastically deformable, obtaining and bringing together two sheets so that at least two edges of one sheet are brought together with at least two edges of the other sheet to obtain at least two edge portions which each comprise two brought-together edges and crimping at least two of the brought-together edge portions to unite the brought-together sheet edges to obtain a crimped container article.

14. A process according to claim 12 or 13 wherein a further improvement comprises adding an edible filling so that the crimped container article contains the filling.

15. A process according to claim 12 or 13 wherein a further improvement comprises adding a plastic toy so that the crimped container article contains the toy.

16. An article comprising a confectionery material container having walls which extend to at least one crimped edge and comprising a plastic toy contained by the container, wherein the confectionery material is selected from the group consisting of a fat-containing chocolate, of a chocolate substitute comprising a cocoa butter replacement and of a chocolate analog comprising a cocoa butter replacement.

* * * * *